United States Patent [19]

Spector

[11] 3,995,396

[45] Dec. 7, 1976

[54] INFLATABLE TERRARIUM ASSEMBLY WITH REPLACEABLE DOMES

[75] Inventor: Donald Spector, Union City, N.J.

[73] Assignee: Applied Research Commodities Industries, Inc., Hyattsville, Md.

[22] Filed: Nov. 17, 1975

[21] Appl. No.: 632,708

Related U.S. Application Data

[63] Continuation-in-part of Ser. No. 533,518, Dec. 17, 1974, Pat. No. 3,939,607.

[52] U.S. Cl. .................................. 47/69; 47/28 R; 47/17; 206/45.33; 206/423; 150/.5; 220/306; 220/4 F

[51] Int. Cl.[2] .......................................... A01G 9/02

[58] Field of Search .............. 47/34 T, 28.1, 39, 17; 206/423, 522, 45.33; 215/100 R, 329, 333; 220/225, 252, 4, 306; 150/.5, 52 R

[56] References Cited

UNITED STATES PATENTS

| | | | |
|---|---|---|---|
| 2,361,029 | 10/1944 | Heinl | 47/17 X |
| 2,601,658 | 6/1952 | Bussert | 47/34 T |
| 2,754,959 | 7/1956 | McCarty | 206/45.33 |
| 2,765,831 | 10/1956 | Tupper | 150/.5 |
| 2,812,769 | 11/1957 | Schaefer et al. | 47/34 T |
| 2,821,230 | 1/1958 | May | 150/52 R |
| 3,066,824 | 12/1962 | Bostrom | 220/306 |
| 3,223,278 | 12/1965 | Allen | 220/306 |
| 3,704,545 | 12/1972 | Van Reisen | 47/34 T |
| 3,869,828 | 3/1975 | Matsumoto | 47/34.11 |
| 3,939,607 | 2/1976 | Spector | 47/34 T |

FOREIGN PATENTS OR APPLICATIONS

| | | | |
|---|---|---|---|
| 1,188,932 | 9/1959 | France | 47/34 T |
| 24,892 | 4/1903 | United Kingdom | 47/39 |

*Primary Examiner*—Edgar S. Burr
*Assistant Examiner*—James R. Feyrer

[57] ABSTRACT

A collapsible terrarium assembly which is inflatable to assume a desired configuration for housing a potted plant or other article to be protectively enclosed. The structure is constituted by a disc-like base and a replaceable dome attachable thereto by means of a coupling ring which is adapted to snap onto a circular ridge formed on the base. The dome is formed by a flexible plastic envelope whose rim is provided with an annular skirt which is interposed between the coupling ring and the base to define a hermetically-sealed enclosure, the envelope including a valve for inflating the dome.

11 Claims, 7 Drawing Figures

INFLATABLE TERRARIUM ASSEMBLY WITH REPLACEABLE DOMES

RELATED APPLICATIONS

This application is a continuation-in-part of my copending application Ser. No. 533,518, filed Dec. 17, 1974 now U.S. Pat. No. 3,939,607.

BACKGROUND OF INVENTION

This invention relates generally to terrarium structures, and more particularly to a hermetically-sealed collapsible terrarium assembly which includes a replaceable dome that is inflatable to assume a desired configuration.

A terrarium is a fully enclosed, small container, wholly or predominantly made of glass or other transparent material, the terrarium being adapted for the indoor cultivation of moisture-loving plants. The earliest form, known as a Wardian case, was invented by an English botanist in the 19th century, the case being constituted by a box-like glass dome fitted over a metal, earthenware or wooden base serving as a pot for growing living plants. Normally, moisture from an exposed plant is dissipated into the atmosphere through transpiration, so that the plant must be watered at frequent intervals, but in a terrarium the loss of moisture is slight and it is not necessary to replenish the water except occasionally.

Because of the growing popularity of terrariums, they are now mass-produced and commercially available in rigid, transparent plastic form. The terrarium consists of a plastic base having a pot formation for receiving plant soil and a plastic dome or shell which fits over the base. Plastic terrariums come in a range of sizes, and the larger ones are not only fairly expensive, but because of their size they are not easily stored when not in use, particularly in a small apartment dwelling.

But a more important drawback of existing types of rigid glass or plastic terrariums is that they are not hermetically sealed, so that even though these enclosed terrariums reduce the loss of moisture, they are incapable of maintaining an atmosphere of high humidity of the type necessary, for example, in promoting the growth of certain exotic or tropical plants. It is for this reason that when bell jars are used as terrariums, it is the present practice to apply grease or oil to the rim of the jar in order to improve the seal thereof.

With a view toward overcoming the drawbacks of existing types of rigid terrariums, there is disclosed in the above-identified copending patent application, a terrarium assembly which makes use of a flexible plastic dome mountable on a base to create a hermetically sealed enclosure, the dome being inflatable to assume a desired configuration.

In the collapsible terrarium assembly disclosed in this copending application, the dome attached to the base by means of a coupling ring, the rim of the dome being permanently secured to the coupling ring which in turn is joinable to the base. Hence while it is possible to replace a given dome with another dome of different size or shape, the replacement dome requires its own ring, which makes it more costly. Moreover, in the prior arrangement, to ensure a hermetic seal, gaskets are necessary, which further adds to the cost and complexity of the assembly.

SUMMARY OF INVENTION

In view of the foregoing, the main object of this invention is to provide a collapsible terrarium assembly of simple, low-cost design, which is hermetically-sealed without the use of gaskets to afford a controlled environment for plants and the like.

More specifically, it is an object of this invention to provide an assembly of the above type which makes use of inflatable domes of clear flexible plastic material, which domes are replaceable, whereby the same assembly may be used with domes of different size and configuration.

A significant advantage of the invention is that because the assembly is operable with interchangeable domes, the assembly is adapted to accommodate growing plants in various phases of their growth. Thus at the outset of plant growth within the terrarium when the plant is but a few inches tall, the use of a tall dome would be incongruous, but as the plant grows in height, a point is reached where it becomes necessary to replace the installed dome with one better suited to the plant.

Another reason why it may be desirable to change the dome has to do with the appearance presented by the terrarium assembly, for while in certain room settings, a dome having, say, a generally cylindrical shape may be appropriate to the existing decor, other settings may dictate a conical or other dome formation. The ability of the user to exchange one dome for another to accommodate plant requirements or to satisfy the dictates of taste represents an important advantage of the invention.

Also an object of this invention is to provide a collapsible terrarium assembly which incorporates a cylindrical shell therein which is adapted to serve as a planter integral with the terrarium, the shell being raised relative to the base of the assembly to afford a return path for moisture evaporated from the plant and condensed on the inner wall of the dome.

Briefly stated, these objects are attained in a collapsible terrarium assembly which includes a disc-like base structure having a circular ridge formed thereon adjacent its periphery, which ridge adapted to cooperate with a snap-on coupling ring. Also provided is a dome formed by an open bag of clear flexible plastic material having a circular rim whose diameter is slightly smaller than the diameter of the ridge, the rim having an annular skirt secured thereto and extending outwardly therefrom.

In assembling the terrarium structure, the skirt of the bag is interposed between the coupling ring and the ridge and the ring is snapped onto the ridge, thereby anchoring the bag and hermetically sealing the dome. The bag is provided with a valve having a mouthpiece whereby the dome may be inflated by the user to produce an atmosphere therein which is rich in carbon dioxide.

Concentrically disposed within the ridge and raised above the base to define narrow clearance spaces is a cylindrical shell serving to define a planter for receiving soil, the spaces permitting the return flow to the soil of moisture evaporated from the plant and condensed on the inner surface of the dome.

OUTLINE OF DRAWINGS

For a better understanding of the invention as well as other objects and further features thereof, reference is made to the following detailed description to be read in conjunction with the accompanying drawings, wherein.

Figures 2, 6, 7:
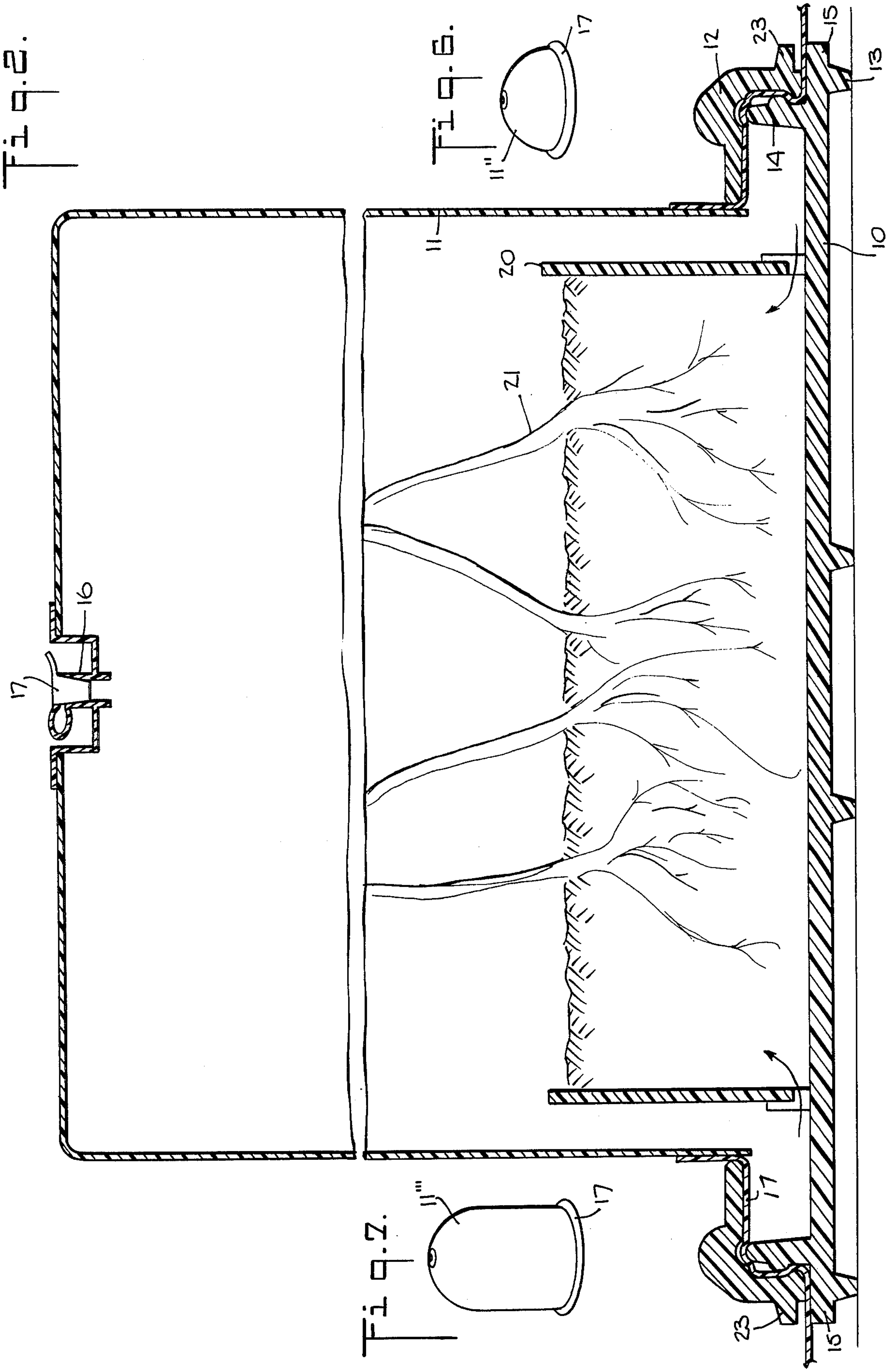
FIG. 2 is a longitudinal section taken through the center of FIG. 1.

FIG. 6 separately shows a dome having a hemispherical form; and

FIG. 7 shows a cylindrical dome having a convex top.

DESCRIPTION OF INVENTION

First Embodiment

Referring now to the drawings and more particularly to FIGS. 1 to 4, a terrarium assembly in accordance with the invention comprises a disc-shaped base 10, an inflatable dome 11 and a coupling ring 12.

Base 10, which is formed of relatively rigid plastic material such as polypropylene, polyethylene or polyester, is provided at its undersurface with a circular pedestal 13 which serves to raise the base slightly above ground level. Formed on the upper face of base 10 is a circular ridge 14, the ridge being adjacent to and concentric with the periphery of the base to define an outer ledge 15. Ridge 14 is provided with a circular bead 14A projecting laterally from the outer surface thereof.

Dome 11 is in the form of an open envelope or bag formed of transparent plastic flexible film material, such as polyvinyl chloride, "Mylar" or any other suitable clear flexible plastic film which is impermeable to air and may therefore be inflated. Dome 11, in the embodiment shown in FIG. 1 possesses a generally cylindrical form having a flat top on which is centrally installed a mouthpiece 16 provided with a removable stopper 17, whereby the dome may be inflated by blowing into it until it assumes its full erect form, at which point the atmosphere within the dome, since it emanates from the lungs of the blower, is rich in moisture as well as carbon dioxide.

Secured to the open circular mouth of the plastic bag and extending outwardly therefrom is a circular skirt 17 having an annular flange 18 which encircles the bag, the skirt being bonded to the mouth of the bag at the junction of the skirt and flange. The function of the flange is to stiffen the mouth and make the installation of the dome easier. The skirt and flange may be formed of the same flexible plastic material as the bag.

Mounted on base 10 and raised slightly thereabout by an array of steps 19 is a cylindrical shell 20 which defines a planter for receiving soil, the narrow space between the base and the lower edge of the shell permitting the return flow to the soil of moisture evaporated from a plant 21 contained in the planter and condensed on the inner surface of the dome. Thus the water is recycled and there is no need to water the plant after it is placed within the terrarium.

Figure 4:
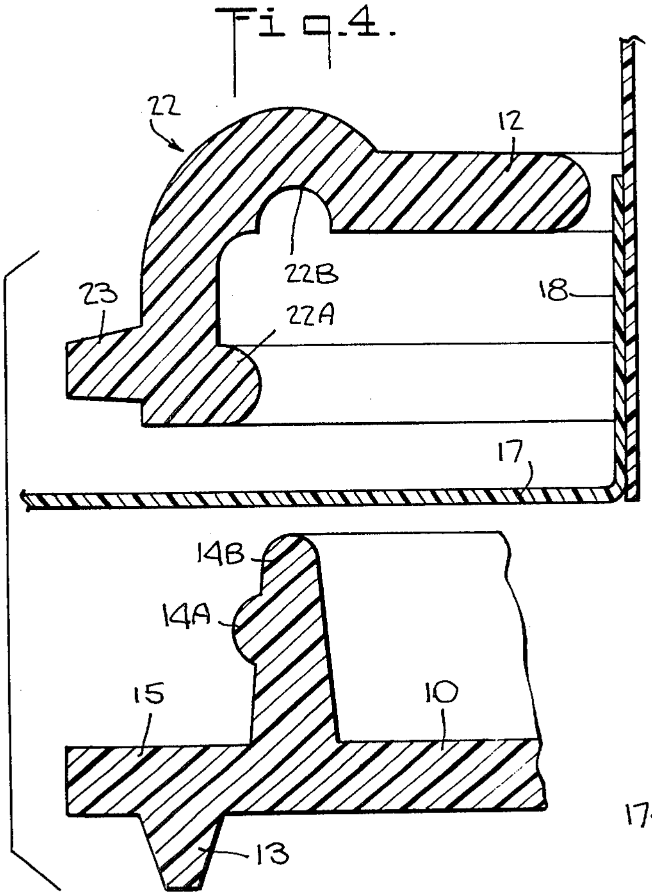
FIG. 4 is a detail showing the relationship between the coupling ring and the circular ridge formed on the base of the assembly.

Coupling ring 12, as best seen in FIG. 4, is formed of resilient plastic material and is provided with a downwardly-curved brim 22 which terminates in an inwardly-directed bead 22A. The junction between brim 22 and the body of ring 12 has a circular groove 22B formed therein adapted to receive the head 14B of ridge 14.

The dimensions of the coupling ring relative to the diameter of ridge 14 are such that groove 22B on the ring registers with head 14B on the ridge, and the inwardly-projecting bead 22A on the ring registers with the outwardly-projecting bead on ridge 14A, so that when the ring is brought down on the ridge, the two beads abut each other to prevent the ring from being seated on ledge 15 on the base. However, since brim 22 of the coupling ring is yieldable, by pressing down on the ring, a snap action is effected whereby the brim is first caused to flex outwardly, causing bead 22A of the ring to bypass bead 14A of the ring and then to be socketed thereunder. Coupling ring 12 is also provided with an outwardly-extending flange 23. When the ring is snapped in place on the base, flange 23 then lies in parallel relation with ledge 15 to provide a narrow annular channel therebetween, within which one may insert a large coin or a flat blade, which, when twisted, causes the ring to unsnap from the ridge.

In assembling the terrarium, first the mouth of the dome is brought down over shell 20 on the base and is centered so that outwardly-extending skirt 17 of the dome then is interposed between ridge 14 and the loose coupling ring 12 thereabove. It is to be noted that the diameter of the mouth of the dome is somewhat greater than the diameter of shell 20 and somewhat smaller than that of ridge 14, so that the dome is receivable above the base between the shell and the ridge and is concentric therewith. When the coupling ring is thereafter snapped onto the ridge, it tightly clamps the skirt of the dome therebetween, thereby hermetically sealing the dome without the need for gaskets or other expedients.

It will be seen that the skirt, which is latched in place by coupling ring 12, extends beyond base 10 of the assembly. In practice, once the skirt is properly clamped, the excessive material beyond the base may be cut off, for it serves no useful function.

Other Embodiments

Figure 1:
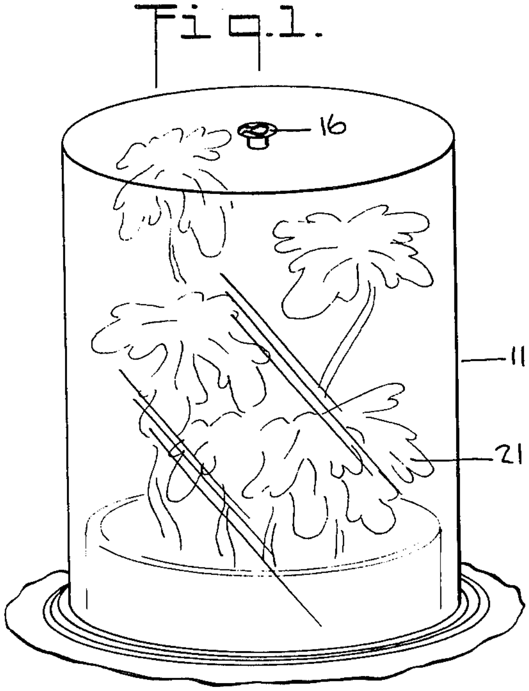
FIG. 1 is a perspective view of a preferred embodiment of a collapsible terrarium assembly in accordance with the invention, as shown in the inflated state.
Figure 3:
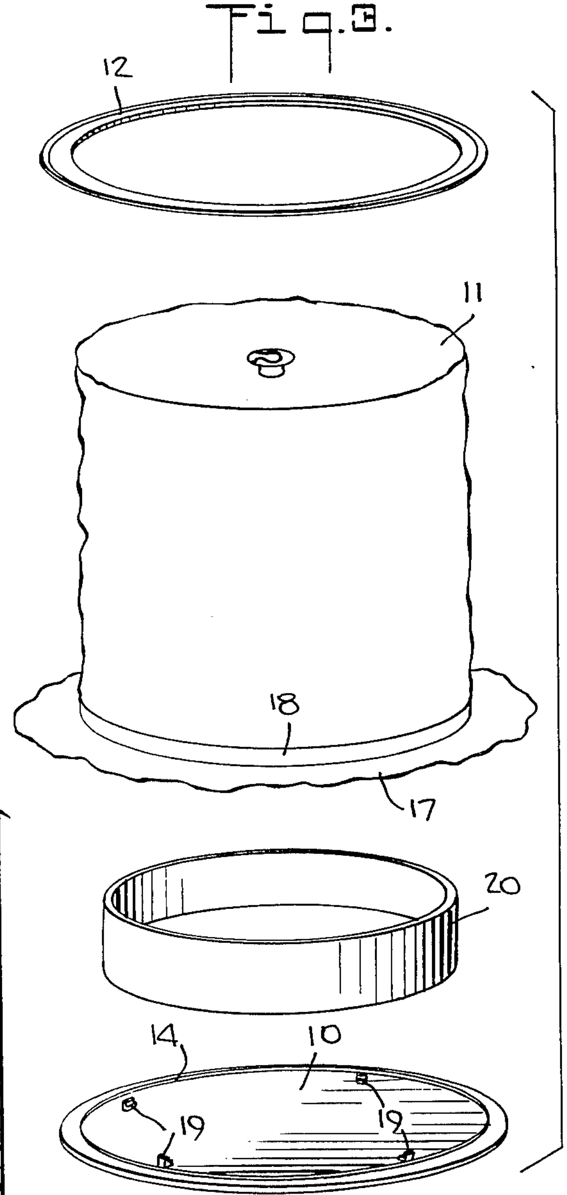
FIG. 3 is an exploded view of the assembly.
Figure 5:
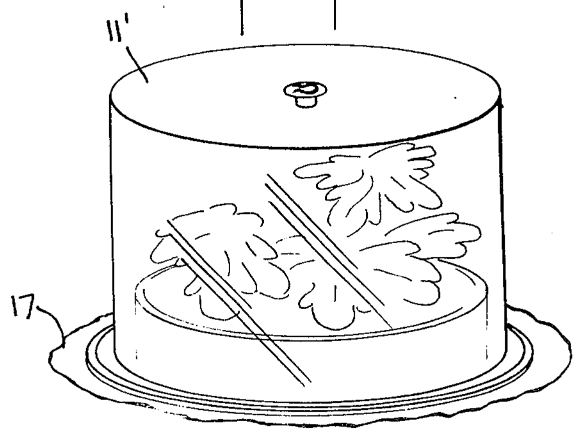
FIG. 5 is the same as FIG. 1, except that the flat-top dome of the assembly is short in height.

The embodiment shown in FIG. 5 is identical to that shown in FIG. 1 except for the form of the dome. In FIG. 5, dome 11', which also includes a mouthpiece and a skirt, has a flat-topped cylindrical formation, the cylinder being shorter than that of the dome in FIG. 1. Thus when the plant enclosed in the terrarium is in its early stages of development, use may be made of the short-form dome shown in FIG. 5; whereas as the plant attains a greater height, this dome may be replaced with the taller dome to provide adequate room for the growing plant.

While the plant may be grown in soil laid down within shell 20, in practice the plant may have its own pot and be placed within the shell. For this purpose, the plant pot should have a bottom hole to receive water condensed from the dome and flowing under the shell.

In FIG. 6 there is shown still another dome formation. In this instance, dome 11'' has a hemispherical form and includes a skirt 17 so that by clamping the skirt between the coupling ring and base ring, the dome may be hermetically sealed. FIG. 7 is still another dome form, and in this case the dome has a cylindrical form with a convex top.

As pointed out previously, there are various dome formations feasible for use in conjunction with the assembly as long as the dome mouth diameter is appropriate to the assembly and the dome is provided with a skirt making it possible to effect hermetic sealing thereof. The interchangeable domes, in all instances, are provided with mouthpieces or valves to permit inflation and erection thereof.

APPLICATIONS

The inflatable terrarium makes it possible to modify and manipulate the plant environment so that new species and more diverse botanical forms may be cultivated within the home.

Most home environments, in terms of atmospheric conditions, vary somewhat from corner to corner and from room to room. But with modern central heating and air conditioning, the typical room atmosphere is generally dry and in fact is excessively so. While a number of factors come into play with regard to the health and survival of a plant, the atmosphere to which the plant is subjected is a major consideration. For the most part, a low humidity atmosphere is deleterious to the health of a typical house plant.

Because a terrarium in accordance with the invention may be inflated by mouth, the atmosphere therein is created by human exhalation and is both humid and rich in carbon dioxide, an atmospheric condition which has been found to be conducive to the growth of most plants. And because the terrarium is hermetically sealed, the atmospheric condition therein is independent of the room atmosphere in which the terrarium is placed.

The simplest and most direct use of the inflatable terrarium is as a housing for potted plants, for these plants may be placed in the terrarium or removed in a matter of seconds, with minimal disturbance or shock. Moreover, the terrarium permits plants having diverse soil requirements to be cultivated together if they have similar atmospheric and light requirements.

By using a large-diameter inflatable terrarium in accordance with the invention, it is possible to create so-called "plant-scapes" consisting of a number of plants so placed or landscaped as to create a mini-world.

A persistent problem faced by urban and apartment dwellers who grow plants at home is contamination. The inflatable terrarium makes it possible to isolate and treat an unhealthy plant, and thereby prevent it from contaminating other plants in the same dwelling. Because the terrarium is hermetically sealed, its interior atmosphere can be fumigated or small amounts of pesticides may be introduced therein without risks to persons who occupy the same room.

The inflatable terrarium is also useful as a germinator-propagator for the private and personal plant grower, for its controlled atmosphere causes seeds to germinate quickly.

The inflatable terrarium is also useful in conjunction with a hydroponic system where in lieu of soil, use is made of small, porous clay rocks or pebbles as a growing medium for plants, the particles serving to store water and plant nutrients dissolved therein. In this instance, the condensed water flowing back into the shell containing the clay particles is absorbed thereby.

Another useful function of a terrarium in accordance with the invention is for long-haul transportation of plants. On an extended trip, the inflated terrarium protects the plants and reduces the amount of care that is needed to maintain their health; whereas on the return trip, the terrarium is collapsed to conserve space.

While the base of the terrarium has been described as being made of plastic, it can be fabricated of metal such as aluminum, or of wood. There is virtually no limit on the size of the inflatable terrarium, and it may in practice be structured to function as a low-cost, sizeable greenhouse for enclosing a large number of plants. Also, particularly in large sizes, the terrarium may be pumped up rather than inflated by mouth, and the atmosphere therein may be elevated above ambient atmospheric pressure so that the interior of the dome is pressurized, a condition favorable to some plants.

While there has been shown and described preferred embodiments of an inflatable terrarium assembly in accordance with the invention, it will be appreciated that many changes and modifications may be made therein without, however, departing from the essential spirit thereof. For example, the base may be in the form of a deep adapted to function as a planter, with the rim of the dish provided with a circular ridge to receive the coupling ring for the dome in the manner previously described. Also, while the base has been described as having a circular open mouth, in practice other geometric forms may be used as long as the skirt of the bag is capable of being clamped between the base and ring to effect a hermetic seal.

I claim:

1. A collapsible terrarium assembly comprising:

A. a base having a circular ridge formed on the upper face thereof adjacent to and concentric with the periphery of the base;

B. a replaceable dome mountable on the base and constituted by a flexible, non self-supporting bag fabricated of clear plastic film material having a circular open mouth from which an annular skirt extends outwardly, the diameter of the mouth being somewhat smaller than the diameter of the ridge, whereby the dome is seated within the ridge;

C. a removable coupling ring attachable to the ridge to clamp the skirt of the dome therebetween to hermetically seal the dome; and D. means secured to the dome to effect inflation and erection thereof.

2. An assembly as set forth in claim 1, wherein the underside of the base is provided with a pedestal to raise the base above ground.

3. An assembly as set forth in claim 1, wherein said inflation means is a mouthpiece having a stopper to permit mouth inflation of the dome, whereby the atmosphere therein is the exhalate of the lungs of the blower.

4. An assembly as set forth in claim 1, wherein said inflation means is a valve adapted to cooperate with a pump.

5. An assembly as set forth in claim 1, further including a cylindrical shell mounted above said base within said ridge to define a planter.

6. An assembly as set forth in claim 5, wherein said shell is mounted on steps to create spaces between the shell and base to admit water into the planter.

7. An assembly as set forth in claim 5, further including porous particles contained within said shell for hydroponically growing plants therein.

8. An assembly as set forth in claim 1, wherein said coupling ring is provided with a resilient circular brim having an inwardly-projecting bead which cooperates with an outwardly-projecting bead formed on the ridge to afford a snap action.

9. An assembly as set forth in claim 8, wherein said brim is provided with a circular flange which, when the coupling ring is snapped in place, forms a channel with the periphery of the base, into which channel a tool may be inserted to detach the ring.

10. An assembly as set forth in claim 1, wherein said ring and said base are formed of synthetic plastic material.

11. An assembly as set forth in claim 1, including a set of replaceable domes of different configuration, each having a skirt whereby any one of the domes may be attached to said base.

* * * * *